United States Patent Office 3,027,347
Patented Mar. 27, 1962

3,027,347
MIXTURES OF VINYL CHLORIDE POLYMERS AND COPOLYMERS OF ACRYLIC ACID ESTERS AND N-VINYLLACTAMS
Hans Fikentscher and Karl Herrle, Ludwigshafen (Rhine), Germany, assignors to Badische Anilin- & Soda-Fabrik Aktiengesellschaft, Ludwigshafen (Rhine), Germany
No Drawing. Filed July 9, 1958, Ser. No. 747,350
Claims priority, application Germany July 20, 1957
10 Claims. (Cl. 260—45.5)

This invention relates to a thermoplastic composition which has especially valuable mechanical properties. The thermoplastic composition according to this invention comprises a mixture of a polymer of vinylchloride and/or vinylidene chloride and a co-polymer of a polymerizable ester and an N-vinyllactam.

Many plastics must be softened before being worked up or in order to produce certain material properties. A disadvantage of the usual low molecular weight softeners, however, is their volatility. Moreover, they are often soluble in organic solvents and the softened plastics therefore readily become embrittled. When softened foils are used as packaging material, the softener may also migrate into the goods packaged therein which is undesirable for hygienic reasons.

It is known that the polymers of the higher acrylic esters can be used as softeners. These have the disadvantage, however, that they have only limited compatibility with plastics and can therefore be added only in small amounts. If the plastics softened with acrylic esters are to be used as lacquer raw materials, they have the further disadvantgae that they are not unobjectionably soluble in the usual lacquer solvents.

We have now found that thermoplastic, highly polymeric, compositions on the basis of a polymer of vinylchloride and/or vinylidene chloride have especially valuable mechanical properties and good solubility when they are mixed with a co-polymer of 80 to 99% of a polymerizable ester with a carbon double linkage and 20 to 1% of an N-vinyllactam.

The term "polymer of vinylchloride and/or vinylidene chloride" as used in this specification includes the homo- and co-polymers in any ratio of these monomers and such homo- and co-polymers as are substantially based on these monomers and contain only minor amounts of other monomers.

As high molecular weight softeners for brittle plastics on the basis of vinylchloride and/or vinylidene chloride there are especially suitable the co-polymers of acrylic or methacrylic esters of alcohols containing up to 12 carbon atoms which by themselves yield soft polymers, thus for example the methyl, ethyl, butyl or dodecyl esters of acrylic acid, the ethyl and butyl esters of methacrylic acid or vinyl esters which contain up to 12 carbon atoms, for example vinyl propionate, vinyl butyrate, and the like.

Suitable vinyl lactams are for example N-vinyl-pyrrolidone, N-vinyl-epsilon-caprolactam and N-vinyl-omega-caprylic lactam. Other vinyl compounds, such as styrene, vinyl ethers, vinyl chloride, vinyl methyl ketone and the like, may however be polymerized-in additionally to a certain extent.

The amount of the vinyllactam in the mixture of the highly polymeric substance on the basis of vinylchloride and/or vinylidene chloride and the copolymer on the basis of a polymerizable ester should amount to 1 to 20, preferably 5 to 10 percent by weight with reference to the weight of the whole mixture.

The degree of polymerization of the co-polymer may be adjusted according to the purpose of use. If only the improvement of the workability or the softening action is important, it is preferable to use relatively low molecular weight polymers with a K-value (according to Fikentscher) of about 20 to 30. If the co-polymer is also required to impart additional strength to the end product, higher molecular weight products with K-values between 60 and 80 or more are of advantage. The adjustment of the most favourable molecular weight can be carried out in known manner by variation of the polymerization conditions.

The said co-polymers can be prepared according to the usual polymerization methods by polymerization in bulk, in emulsion or in suspension. In bulk polymerization it is preferable to add suitable regulators in order to moderate the turbulent reaction. In this way it is possible to prepare polymers with K-values below 15.

The said co-polymers have an excellent solubility. In addition to being soluble in aromatics, esters or ketones, they are also soluble in simple alcohols and, depending on their composition, also in gasoline hydrocarbons. They are compatible with numerous plastics and binding agents, for example with polyvinylchloride and vinylchloride co-polymers, vinylidene co-polymers, cellulose esters, alkyd resins, urea resins and the like. In lacquers they substantially improve the firmness of adhesion.

The co-polymers may be worked into the polymers on the basis of vinylchloride and/or vinylidene chloride in different ways. In the production of lacquers, the components may be dissolved together in a suitable solvent. In the case of compositions which are to be worked up on rollers, the co-polymers may be added directly on the rollers. Frequently, however, it is desirable to carry out the mixing prior to the working up, for example in the usual mixers or kneaders.

The mixing may also be carried out during the working up or production of the polymers. Thus for example the emulsion of the co-polymer may be mixed with a polyvinylchloride emulsion and the mixture worked up according to the usual methods, for example by precipitation, drying or atomization, or the co-polymer may be added to the batch of monomer of the polymer to be softened proir to its polymerization.

The amount in which the co-polymer is added to the other polymer may vary within wide limits. Even in addition of 1 to 5% considerably improves the workability of polyvinylchloride. By working about 10 to 20% of an N-vinyllactam co-polymer into polyvinylchloride, the impact strength of the same is substantially increased. For the production of foils and films, up to 50% or more of the co-polymers may be introduced. Such mixtures may also contain additionally the usual softeners. The thermoplastic composition, therefore, should contain from about 50% to about 99% by weight of polyvinyl chloride or a copolymer of vinyl chloride and vinylidene chloride.

The following examples will further illustrate this invention but the invention is not restricted to these examples. The parts specified in the examples are parts by weight. The K-values are determined according to the method of Fikentscher (Cellulose-Chemie 13 (1932), page 58).

*Example 1*

98 parts of butyl acrylate and 2 parts of N-vinyl-caprolactam are polymerized in a 40% emulsion in known manner. The polymer has a K-value of 92 (measured in benzene).

20 parts of the emulsion thus prepared are mixed with 80 parts of a 40% emulsion of polyvinylchloride with a K-value of 70 and the mixture dried in an atomizing drier.

The polymer mixture thus obtained is especially suitable for the production of impact-resistant shaped articles and plates. The notch impact strength determined on pressed normal rods amounted to 52 kg. cm./cm.$^2$

Example 2

90 parts of butyl acrylate, 10 parts of N-vinyl-pyrrolidone-2 and 5 parts of cyclohexene are mixed and then 0.2 part of each of lauroyl peroxide and ditertiary butyl peroxide are added. 10 parts of this mixture are introduced into a polymerization vessel and polymerized at about 100° C. under reflux. The remainder of the mixture is allowed to flow in at a slowly rising temperature at the rate at which the polymerization progresses. After finishing off the polymerization at 150° C., an oil is obtained which is very viscous at room temperature and has a K-value of 18.

100 parts of a co-polymer of 85 parts of vinylidene chloride and 15 parts of vinylchloride are mixed in a mixer with 10 parts of the said co-polymer. The resultant free-flowing powder may be converted into almost colorless threads with an extruder at 130° C. The threads have a tensile strength of about 20 kg./cm.$^2$

Example 3

95 parts of ethyl acrylate and 5 parts of N-vinyl-pyrrolidone-2 are copolymerized in a 40% emulsion with the addition of 5 parts of allyl alcohol. A polymer is obtained having a K-value of about 30 measured in benzene.

100 parts of vinylchloride are polymerized in a pressure container provided with a stirrer in the presence of 400 parts of water, 0.2 part of azo-di-isobutyronitrile, 0.2 part of gelatine and 25 parts of the above-mentioned emulsion. The finely granular polymer obtained may be worked up on a calender to clear, lustrous foils which may be still further considerably improved in their mechanical properties by a short subsequent heating to 250° C.

What we claim is:

1. A thermoplastic composition comprising from about 50 to about 99% by weight of a member selected from the group consisting of polyvinyl chloride and a copolymer of vinyl chloride and vinylidene chloride, and from about 1 to about 50% by weight of a copolymer of (A) from about 80 to about 99% by weight of a polymerizable ester of an acid selected from the group consisting of acrylic acid and methacrylic acid and an alkanol containing from 1 to 12 carbon atoms, and (B) from about 1 to about 20% by weight of an N-vinyllactam.

2. A thermoplastic composition as in claim 1 wherein the polymerizable ester (A) is butyl acrylate.

3. A thermoplastic composition as in claim 1 wherein the polymerizable ester (A) is ethyl acrylate.

4. A thermoplastic composition as in claim 1 wherein the polymerizable ester (A) is butyl acrylate and wherein the N-vinyllactam (B) is N-vinylpyrrolidone-2.

5. A thermoplastic composition as in claim 1 wherein the polymerizable ester (A) is butyl acrylate and wherein the N-vinyllactam (B) is N-vinylcaprolactam.

6. A thermoplastic composition as in claim 1 wherein the polymerizable ester (A) is ethyl acrylate and wherein the N-vinyllactam (B) is N-vinylpyrrolidone-2.

7. A thermoplastic composition as in claim 1 wherein the polymerizable ester (A) is ethyl acrylate and wherein the N-vinyllactam (B) is N-vinylcaprolactam.

8. A composition of matter comprising from 80 to 99% by weight of polyvinylchloride and from 20 to 1% by weight of a co-polymer of about 98% by weight of butylacrylate and about 2% by weight of an N-vinylcaprolactam.

9. A composition of matter comprising from 50 to 99% by weight of a co-polymer of vinylchloride and vinylidene chloride and from 50 to 1% by weight of a co-polymer of about 90% by weight of butylacrylate and of about 10% by weight of N-vinylpyrrolidone.

10. A composition of matter comprising from 50 to 99% by weight of polyvinylchloride and from 50 to 1% by weight of a copolymer of about 95% by weight of ethyl acrylate and about 5% by weight of N-vinylpyrrolidone.

References Cited in the file of this patent

UNITED STATES PATENTS

| | | |
|---|---|---|
| 2,311,249 | Powell | Feb. 16, 1943 |
| 2,475,626 | Leatherman | July 12, 1949 |
| 2,713,568 | Fisher | July 19, 1955 |
| 2,791,600 | Schwaegerle | May 7, 1957 |
| 2,853,465 | Werner | Sept. 23, 1958 |
| 2,888,410 | Buchholz | May 26, 1959 |

OTHER REFERENCES

Breitenbach: Elektrochem 59, 309–11 (1955).